US012579855B2

(12) United States Patent
Gardiner et al.

(10) Patent No.: US 12,579,855 B2
(45) Date of Patent: Mar. 17, 2026

(54) DOOR LOCK WITH LOWER POWER STATE

(71) Applicant: ASSA ABLOY Access and Egress Hardware Group, Inc., New Haven, CT (US)

(72) Inventors: William Gardiner, Woodland, WA (US); Joseph Sceviour, Hingham, MA (US)

(73) Assignee: ASSA ABLOY Access and Egress Hardware Group, Inc., New Haven, CT (US)

( * ) Notice: Subject to any disclaimer, the term of this patent is extended or adjusted under 35 U.S.C. 154(b) by 161 days.

(21) Appl. No.: 18/404,373

(22) Filed: Jan. 4, 2024

(65) Prior Publication Data

US 2024/0249574 A1 Jul. 25, 2024

Related U.S. Application Data

(60) Provisional application No. 63/480,759, filed on Jan. 20, 2023.

(51) Int. Cl.
*G07C 9/00* (2020.01)

(52) U.S. Cl.
CPC .................... *G07C 9/00309* (2013.01); *G07C 2009/00333* (2013.01); *G07C 2009/00769* (2013.01)

(58) Field of Classification Search
None
See application file for complete search history.

(56) References Cited

U.S. PATENT DOCUMENTS

| | | | | |
|---|---|---|---|---|
| 9,792,747 | B2 * | 10/2017 | Baumgarte | G07C 9/00563 |
| 10,529,156 | B2 * | 1/2020 | Myers | G07C 9/00309 |
| 10,952,077 | B1 * | 3/2021 | Holt | H04W 12/069 |
| 11,417,159 | B2 * | 8/2022 | Li | H04L 63/062 |
| 11,657,662 | B2 * | 5/2023 | Setter | G07C 9/00571 340/12.5 |
| 11,671,807 | B2 * | 6/2023 | Padgett | H04B 5/26 343/702 |
| 12,159,497 | B2 * | 12/2024 | Kuenzi | G06F 21/45 |
| 2014/0340195 | A1 | 11/2014 | Polak et al. | |
| 2014/0340196 | A1 | 11/2014 | Myers et al. | |
| 2015/0116075 | A1 | 4/2015 | Cregg et al. | |
| 2019/0289553 | A1 | 9/2019 | Kincaid et al. | |
| 2020/0327757 | A1 | 10/2020 | Kelley et al. | |

OTHER PUBLICATIONS

International Search Report and Written Opinion mailed Apr. 24, 2024 for International Application No. PCT/US2024/010295.

* cited by examiner

*Primary Examiner* — K. Wong
(74) *Attorney, Agent, or Firm* — Wolf, Greenfield & Sacks, P.C.

(57) ABSTRACT

Systems and methods for enabling a door lock coupled to a door in a building to operate in a lower-power state and achieve reduction of power usage, while still being able to timely receive high-priority messages through operation of an intermediary device. The door lock can establish an association with the intermediary device in a higher-power state and maintain the association with the intermediary device when the door lock switches to operating in the lower-power state. Maintaining the previously-established association with the intermediary device during the lower-power state enables timely receipt of high-priority messages by the door lock.

20 Claims, 6 Drawing Sheets

DOOR LOCK WITH LOWER POWER STATE

CROSS-REFERENCE TO RELATED APPLICATIONS

This application claims the benefit of priority under 35 U.S.C. 119(e) to U.S. Provisional Patent Application Ser. No. 63/480,759, filed Jan. 20, 2023, entitled "DOOR LOCK WITH LOWER POWER STATE", which is incorporated by reference herein in its entirety.

BACKGROUND

Smart door locks may allow for remote and/or keyless entry into buildings. With some such smart door locks, a user may use their mobile devices to wirelessly communicate to the smart door lock a trigger to lock or unlock a locking mechanism of the door lock. Such a wireless communication may be transmitted direct from the mobile device to the smart door lock when the mobile device is proximate to the door lock, or may be transmitted indirectly via a server.

BRIEF SUMMARY

Some embodiments provide for a method for enabling a door lock coupled to a door of a building to operate in a lower-power state while enabling communication between the door lock and a remote computing device, wherein the door lock consumes less power when operated in the lower-power state than when operated in a higher-power state. The method comprises: receiving from the remote computing device, at a first computing device located at the building, a first message transmitted by the remote computing device to the door lock at the building, wherein: the first computing device is distinct from the door lock and has previously associated with the door lock, the door lock has previously established and terminated a connection with the remote computing device prior to the receiving the first message, and the first message has a higher priority than a second message having a lower priority than the higher priority; storing the first message at the first computing device until a first communication is received by the first computing device from the door lock; and in response to receiving the first communication from the door lock, transmitting to the door lock the first message received from the remote computing device.

Some embodiments provide for a system that comprises: a door lock coupled to a door of a building, wherein the door lock is configured to operate in a lower-power state while enabling communication between the door lock and a remote computing device, and wherein the door lock consumes less power when operated in the lower-power state than when operated in a higher-power state; and a first computing device located at the building, wherein the first computing device is configured to: receive, from the remote computing device, a first message transmitted by the remote computing device to the door lock at the building, wherein: the first computing device is distinct from the door lock and has previously associated with the door lock, the door lock has previously established and terminated a connection with the remote computing device prior to receiving the first message, and the first message has a higher priority than a second message having a lower priority than the higher priority; store the first message until a first communication is received by the first computing device from the door lock, and in response to receiving a first communication from the door lock, transmit to the door lock the first message received from the remote computing device Some embodiments provide for a method for enabling a door lock coupled to a door of a building to operate in a lower-power state while enabling communication between the door lock and a remote computing device, wherein the door lock consumes less power when operated in the lower-power state than when operated in a higher-power state. The method comprises: receiving, at the door lock and from the remote computing device, at least one first message via a communication session between the door lock and the remote computing device, the at least one first message having a lower priority than at least one second message having a higher priority than the lower priority; in response to receiving at least one third message to terminate the communication session between the door lock and the remote computing device, terminating the communicating session; retaining an association between the door lock and a first computing device located at the building, wherein the first computing device is distinct from the door lock; following the receiving of the at least one third message and without receiving a further message to re-establish the communication session between the door lock and the remote computing device: transmitting a first communication to the first computing device, the first communication comprising a request for the at least one second message stored at the first computing device, wherein the at least one second message was transmitted to the first computing device by the remote computing device; and receiving the at least one second message from the first computing device in response to the first communication.

BRIEF DESCRIPTION OF DRAWINGS

Various aspects and embodiments will be described with reference to the following figures. It should be appreciated that the figures are not necessarily drawn to scale. Items appearing in multiple figures are indicated by the same or a similar reference number in all the figures in which they appear.

DETAILED DESCRIPTION

Figure 1:
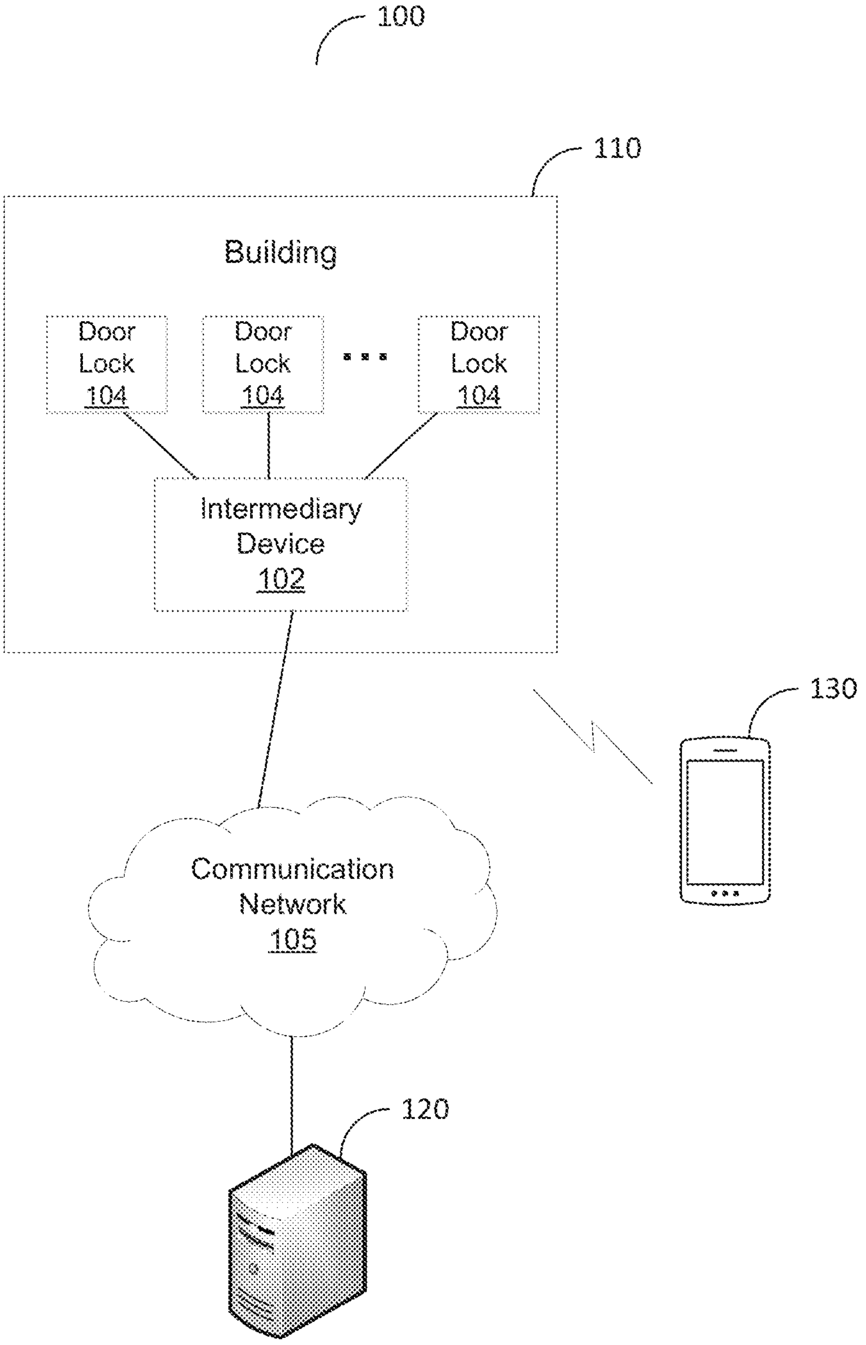
FIG. 1 is an example door lock system with which some embodiments of the technology described herein may operate.

Described herein are embodiments of a door lock system that enable a door lock in a building to operate in a lower-power state and thus achieve reduction of power usage, while still being able to timely receive high-priority messages through operation of an intermediary device. Some door lock systems described herein include an intermediary device located at the building and a remote server device located remote from the door lock and the intermediary device, either in a different portion of the building or remote from the building. The door lock may wirelessly communicate with the intermediary device. The door lock can establish an association with the intermediary device in a higher-power state and maintain the association with the intermediary device when the door lock switches to operating in the lower-power state. The intermediary device may receive, from a remote server device, a first message (e.g., a high priority message) transmitted by the remote server device to the door lock. When the first message is received, the door lock may be associated with the intermediary device but not connected with the remote server device. The intermediary device may store the first message until it receives a first communication from the door lock. In response to receiving the first communication from the door lock, the intermediary device may transmit the first message to the door lock.

Smart door locks allow users to lock or unlock doors remotely using their devices (e.g., mobile devices). For example, a user may utilize an application installed on his mobile device to wirelessly communicate requests to lock or unlock a door lock coupled to a door at his home. The requests may be communicated by the application to a server device that manages access to the door lock. For example, the server device may manage access permissions to the door lock such that authorized users are allowed to lock or unlock the door lock and/or manage configuration settings associated with the door lock. In some scenarios, in response to a request from the application—for example, a request to unlock the door lock—the server device may relay the request to an intermediary device (e.g., an access point at the user's home) that instructs the door lock to unlock.

Various door locks in a building (e.g., a user's home, an office, a school, etc.) may be managed and controlled by the server device. In addition to communicating lock and/or unlock requests to door locks via the intermediary device, there may be scenarios in which the server device may need to communicate high-priority or time-sensitive messages to the door locks. Such high-priority or time-sensitive messages may include, for example, messages instructing a lock down when a threat is detected in an area, instructing revocation of access rights for an intruder or guest without proper access permissions or instructing addition of users who need immediate access.

Typically, such high-priority or time-sensitive messages are communicated by the server device to the door locks via hardwired connections to the server device. Conventional hardwired communications have been used to provide timeliness in communication as well as certainty of communication by avoiding some of the possible issues of slow or unreliable communication that can arise with wireless connections. However, installing such hardwired connections can limit where the wired door locks can be installed as well as significantly increase installation costs. Moreover, once such a hardwired connection is installed, it may need to be maintained, increasing lifetime costs and deployment complexities.

Some conventional systems enable door locks to wirelessly communicate with the server device. In such systems, to ensure the door locks timely receive high-priority messages from the server device and are able to timely respond to them (e.g., by locking down promptly in response to a detected threat), the door locks may need to be maintained in an "on" state (e.g., a high-power state) for extended periods of time. Maintaining the door locks in this high-power state negatively impacts the battery life of the door locks. This presents a maintenance burden and cost to frequently changing batteries. Moreover, the possibility of a dead battery in a door lock raises concerns about unreliability of wireless communication. Together with the safety concerns represented by high-priority messages and the possibility of significant negative consequences to a missed message (e.g., a security threat not being blocked by a door that was unlocked due to a dead battery), building administrators or other lock installers have been deterred from using such wireless options.

In view of the above, the inventors have recognized and appreciated the advantages that would be offered by a door lock system that offered reliable, timely wireless communication for high-priority messages while offering power-saving features through operating in a two-power state. In some embodiments described herein, even when the lock is operating in a low-power state, the door lock is operating in an overall system that enables the lock to receive and respond to high-priority messages promptly.

Described herein are embodiments of an improved door lock system that may mitigate challenges of conventional door lock systems discussed above. The improved door lock system of some embodiments described herein includes one or more door locks that wirelessly communicate with an intermediary device. Each door lock that communicates wirelessly with the intermediary establishes and then maintains an association with that intermediary device. Such an intermediary device may be, for example, a wireless access point. The door lock can establish the association in a higher-power state and maintains the association with the intermediary device when the door lock switches to operating in the lower-power state. Maintaining the previously-established association with the intermediary during the lower-power state enables timely receipt of high-priority messages by the door lock, as described below.

The system also includes a server device which may from time-to-time need to communicate to the door lock(s) messages of different priority or urgency levels. The server device may be located remote from the door lock, which may be in another part of a same building as the door lock or geographically remote from the building. The door lock communicates to the server device via the intermediary device and may from time to time establish a connection to the server device through the intermediary device and receive the messages via the connection from the server device. In some embodiments, a door lock may be configured to, upon installation in a building and/or boot up, or otherwise occasionally or periodically (e.g., at an interval), establish a wireless connection with the server device. The door lock may establish the connection so as to receive the messages from the server device, in the event that at the time of the connection communications are being held by the server device for delivery to the door lock. Such messages are not limited to including any particular content and may, for example, include one or more software updates or upgrades for the door lock from time to time, or security changes or security policy updates that may not be time sensitive. The server device may hold such messages to be sent via a connection established occasionally or periodically with the door lock. When establishing the connection and communicating with the server device, the door lock may operate in a higher-power state. In the higher-power state, for example, the door look may be conducting active transmission of data (e.g., meaningful data) via the connection. This can include, for example, transmitting the requisite data to establish the connection and/or transmitting data to the server device.

Those skilled in the art will appreciate that such a wireless connection could be maintained between the door lock and server device for the purpose of communicating messages at any time, including high-priority messages. However, maintaining the connection between the door lock and the server device may in some circumstances increase power requirements of communication, and thus may impact battery life. In some embodiments described herein, therefore, the connection between the server device and a door lock may therefore be terminated from time to time. At such times, or some such times, the door lock may also be placed into a lower-power state that consumes less power than a higher-power state. During the lower-power state, as mentioned above, the door lock maintains its association with the intermediary. In the lower-power state, no transmission of data (e.g., meaningful data to the server device) may take place. Rather, only bare minimum tasks or communications may be performed to maintain the association. The door lock may transition from the lower-power state to the higher-power state, at which time transmission of data may take place.

Following termination of the connection, the server device may still maintain information regarding the intermediary device via which the server device communicated with the door lock, and with which the door lock has maintained the association during the lower-power state. When the server device has a high-priority message to be communicated to a door lock, the server device communicates the high-priority message to the intermediary device. The intermediary device stores the high-priority message until a communication is received from the door lock. In the lower-power state, the door lock may occasionally or periodically enter the higher-power state or otherwise enter a state to communicate with the intermediary device. Upon receiving a communication from the door lock, the intermediary device transmits the high-priority message to the door lock. The door lock may communicate with the intermediary device at a short enough interval to ensure timely receipt of high-priority messages from the server device, while gaining the power-saving benefit of the lower-power state. Embodiments are not limited to operating with any particular interval, though examples of intervals that are advantageous in some scenarios are discussed herein.

Accordingly, some embodiments described herein enable a door lock to operate in a lower-power state and thus achieve reduction of power usage, while still being able to timely receive high-priority messages through operation of an intermediary device. More particularly, by establishing an association with the intermediary device and then maintaining the association during the lower-power state, and then periodically or occasionally communicating with the intermediary device to receive messages received by the intermediary device from a server device, the door lock may be able to timely receive and respond to the high-priority messages while obtaining the power-consumption benefits of a lower-power state.

Illustrative implementations of such techniques and systems are described below. It should be appreciated, however, that embodiments are not limited to operating in accordance with these examples. Other embodiments are possible.

FIG. 1 is an example door lock system 100 with which some embodiments of the technology described herein may operate. Door lock system 100 may include an intermediary computing device 102 configured to wirelessly communicate with one or more door locks 104 in a building 110. The intermediary computing device 102 may be located at the building 110. In some embodiments, the intermediary computing device 102 may be configured to communicate with the door lock(s) 104 using wireless technology, such as WiFi technology.

Door lock system 100 may include a remote computing device 120 located remote from the door lock(s) 104 and the intermediary computing device 102, either in a different portion of the building 110 or a location that is geographically remote from the building 110. Door lock(s) 104 may be configured to communicate with the remote computing device 120 via the intermediary computing device 102. The remote computing device 120 may communicate with the intermediary computing device 102 via a communication network 105. Communication network 105 may support different types of protocols, such as HTTP (hyper-text transfer protocol), TCP (Transmission Control Protocol), and/or other protocols.

The intermediary computing device 102 may be configured to communicate messages received from a mobile device 130 and/or a remote computing device 120 to door lock(s) 104. As an example, the intermediary computing device 102 may receive messages that include requests to lock or unlock a locking mechanism of door lock(s) 104 from a mobile device 130. A user may, for example, communicate a request to lock or unlock a door lock located in his home using his mobile device 130. As another example, the intermediary computing device 102 may receive lower priority messages or messages that may not be time sensitive from remote computing device 120. Such lower priority messages may include one or more software updates or upgrades for the door lock from time to time, or security changes or security policy updates for the door lock. As yet another example, the intermediary computing device 102 may receive high priority messages (i.e., messages having higher priority than the lower priority messages) or messages that may be time sensitive from the remote computing device 120. Examples of such higher priority messages may include messages instructing a lock down when a threat is detected in an area or instructing revocation of access rights for an intruder or guest without proper access permissions. Other types of time sensitive/high priority messages and/or low priority messages may be communicated without departing from the scope of the disclosure.

Figure 2:
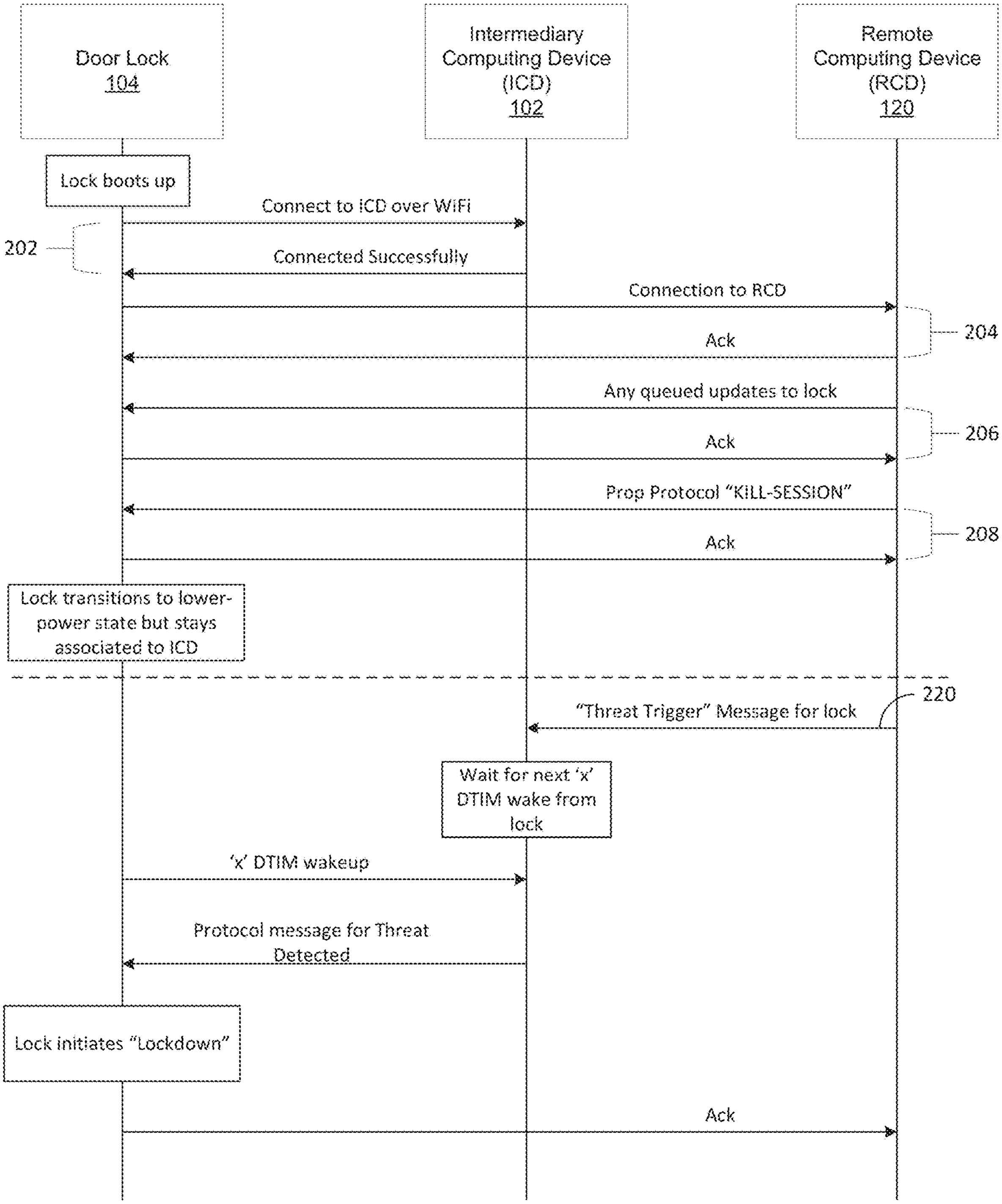
FIG. 2 is a diagram depicting an example flow of communications between various components of a door lock system, according to some embodiments of the technology described herein.

FIG. 2 is a diagram depicting an example flow of communications between various components of a door lock system, according to some embodiments of the technology described herein. In some embodiments, a door lock 104 may be configured to, upon installation in a building and/or boot up, associate with the intermediary computing device 102. The association may be established by exchanging association request and association response messages. For example, the door lock 104 may communicate an association request message to the intermediary computing device 102. The intermediary computing device 102 may determine whether to grant or deny the request. In response to a determination to grant the request, the intermediary computing device 102 may communicate an association response message to the door lock 104. The association response message may include an association identifier for the door lock 104. This association identifier may identify the door lock 104 for subsequent communications between the intermediary computing device 102 and the door lock 104. It will be understood that the intermediary computing device 102 may associate in this manner with multiple door locks 104 in the building 110, for example, by assigning and communicating association identifiers for each lock of the multiple locks.

In some embodiments, once associated, the door lock 104 may establish a connection with the intermediary device 102 and any communications to and from the door lock 104 may be communicated wirelessly via the intermediary computing device 102. In some embodiments, the messages may be communicated to and from the door lock 104 via a wireless connection established with the intermediary computing device 102. In some embodiments, the connection between the door lock 104 and the intermediary computing device 120 may be established by exchanging communications 202.

In some embodiments, a door lock 104 may be configured to, upon installation in a building and/or boot up, or otherwise occasionally or periodically (e.g., at an interval), establish a connection with the remote computing device 120. The door lock 104 may communicate with the remote computing device 120 via the intermediary computing device 102 and may from time to time establish the connection to the remote computing device 120 through the intermediary computing device 102 and receive messages via the connection from the remote computing device 120. The connection between the door lock 104 and the remote computing device 120 may be established by exchanging communications 204, such as connection request and acknowledgement communications. In some embodiments, information generated as part of the association process, such as the association identifier of the door lock associated with the intermediary computing device 102, may be shared with the remote computing device 120.

In some embodiments, in the event that at the time the connection between the door lock 104 and the remote computing device 120 is established, messages are being held by the remote computing device 120 for delivery to the door lock 104, such messages are communicated to the door lock 104 by exchanging communications 206. In some embodiments, the intermediary computing device 102 may receive, from the door lock 104, a query to the remote computing device 120 for messages to be delivered to the door lock. In response, the intermediary computing device 120 may relay the query to the remote computing device 120, receive the messages from the remote computing device 120, and relay the messages to the door lock 104. Such messages may not be limited to including any particular content and may, for example, include one or more software updates or upgrades for the door lock from time to time, or security changes or security policy updates that may be lower priority and not time sensitive. The remote computing device 120 may hold such messages to be sent via the connection established occasionally or periodically with the door lock 104.

The door lock 104 may operate in a higher-power state when the connection between the door lock 104 and the remote computing device 120 is established. Although maintaining the connection between the door lock 104 and remote computing device 120 may be beneficial for the purpose of communicating messages at any time, including higher priority messages from the remote computing device 120 to the door lock 104, maintaining such a connection would require the door lock to operate in the higher-power state, thereby negatively impacting battery life. In some embodiments, therefore, the connection between the remote computing device 120 and the door lock 104 may be terminated from time to time. At such times, or some such times, the door lock 104 may transition into a lower-power state that consumes less power than the higher-power state. In some embodiments, during the lower-power state, the door lock 104 may terminate its connection with the remote computing device 120 but maintain its association with the intermediary computing device 102. In some embodiments, the intermediary computing device 102 may relay, between the door lock 104 and the remote computing device 120, one or more messages to terminate the communication session between the remote computing device and the door lock while retaining an association between the intermediary computing device and the door lock.

In some embodiments, the connection between the remote computing device 120 and the door lock 104 may be terminated by exchanging communications 208. For example, the remote computing device 120 may communicate a "KILL-SESSION" command to the door lock 104 to terminate the connection. Following termination of the connection, the remote computing device 120 may still maintain information regarding the intermediary computing device 102 via which the remote computing device 120 communicated with the door lock 102, and with which the door lock 104 has maintained the association during the lower-power state. This information may include an identifier identifying the intermediary computing device 102 and the association identifiers generated by the intermediary computing device 102, where the association identifiers identify the door locks that the intermediary computing device 102 is associated with.

In some embodiments, when in the lower-power state, the door lock 104 may, occasionally or periodically at a pre-determined interval, enter a higher-power state to communicate with the intermediary computing device 102. The inventors have recognized that configuring the pre-determined interval to be a short enough interval may ensure that any high-priority messages for the door lock 104 that are received by the intermediary device 102 from the remote computing device 120 may be promptly communicated to the door lock 104. In some embodiments, the pre-determined interval may be configured as a multiple of a typical DTIM (Delivery Traffic Indication Message) interval (depicted as 'x' DTIM in FIG. 2). In some implementations, the value of 'x' may be set as 8, such that pre-determined interval may be configured with a value 800 milliseconds (i.e., 8*the DTIM value of 100 milliseconds). It will be understood that the embodiments described herein are not limited to operating with this particular interval value and other values may be utilized as long as timely reception of high-priority messages may be ensured.

In some embodiments, the intermediary computing device 102 may have communicated the pre-determined interval to the door lock 104 during the association process, for example, by including pre-determined interval in the association response.

In some embodiments, when the remote computing device 120 has a high-priority message to be communicated to a door lock 104, the remote computing device 120 may communicate the high-priority message to an intermediary computing device 102 (as shown by communication 220 in FIG. 2). The remote computing device 120 may communicate the high-priority message to intermediary computing device 102 using the information it maintained regarding the intermediary computing device 102 (e.g., following termination of the connection between the remote computing device 120 and the door lock 104). In some embodiments, the intermediary computing device 102 receives the high-priority message from the remote computing device 120 without relaying a message to re-establish a connection between the remote computing device 120 and the door lock 104.

The intermediary computing device 102 may store the high-priority message until a communication is received from the door lock 104. For example, the door lock 104 may, periodically at the pre-determined interval, transition to a higher-power state and poll the intermediary computing device 102 for messages stored at the intermediary computing device 102. Polling the intermediary computing device 102 may comprise transmitting a polling message to the intermediary computing device 102. In response, the intermediary computing device 102 may communicate the stored messages, for example, any high-priority messages to the door lock 104.

One example of such a high-priority message is a message instructing a lock down when a threat is detected in an area. As shown in FIG. 2, the remote computing device 120 may communicate such a "Threat Trigger" message for the door lock 104 to the intermediary computing device 102. In some embodiments, such a message may be triggered based on a communication from a user device, such as mobile device 130, where the user may indicate that a threat, such as an active shooter, is detected in the building. In some embodiments, such a message may be triggered in response to a monitoring condition being met, for example, a broken window or forced door, gunshot sound detection, or some condition being detected in a security footage. When communicated to the door lock 104, the door lock 104 may trigger a lockdown operation by actuating a locking mechanism to lock the door lock.

Once the lockdown operation has been completed, the door lock 104 may communicate an acknowledgement message to the remote computing device 120 and transition back to the lower-power state.

Figure 3:
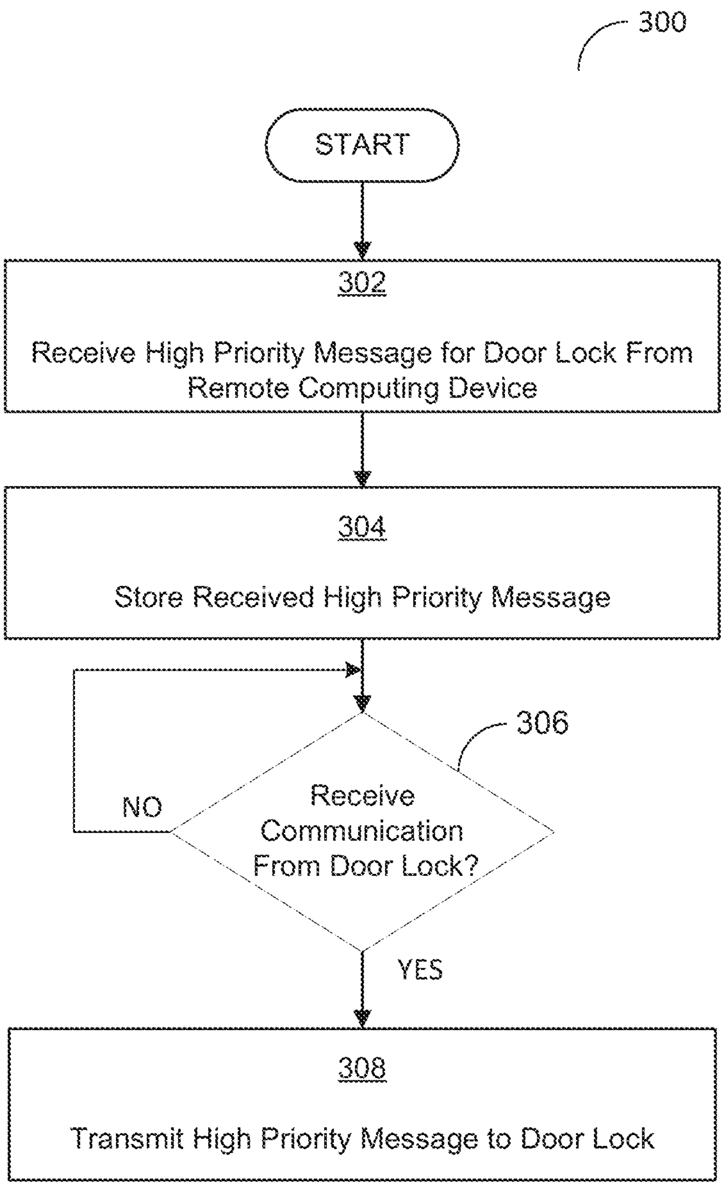
FIG. 3 is an example process performed by an intermediary computing device to enable timely communication of high-priority messages to a door lock, according to some embodiments of the technology described herein.

FIG. 3 is an example process performed by an intermediary computing device 102 to enable timely communication of high-priority messages to a door lock 104, according to some embodiments of the technology described herein. At act 302, intermediary computing device 102 may receive a high-priority message for a door lock 104 from remote computing device 120. When the high-priority message is received, the door lock 104 is not connected to or otherwise associated with the remote computing device 120.

At act 304, the intermediary computing device 102 may store the high priority message. At act 306, the intermediary computing device 102 may determine whether a communication is received from the door lock 104. For example, the communication may include a polling message sent to the intermediary computing device 102 at a pre-determined interval. The door lock 104 may at the pre-determined interval transition from a lower-power state to a higher-power state to send the communication to the intermediary computing device 102.

At act 308, in response to receiving a communication from the door lock 104, the intermediary computing device 102 may transmit the stored high-priority message to the door lock 104.

In some embodiments, when a communication from the door lock 104 is not received, the intermediary computing device 102 may continue to wait for a communication (i.e., polling message) from the door lock 104.

Figure 4:
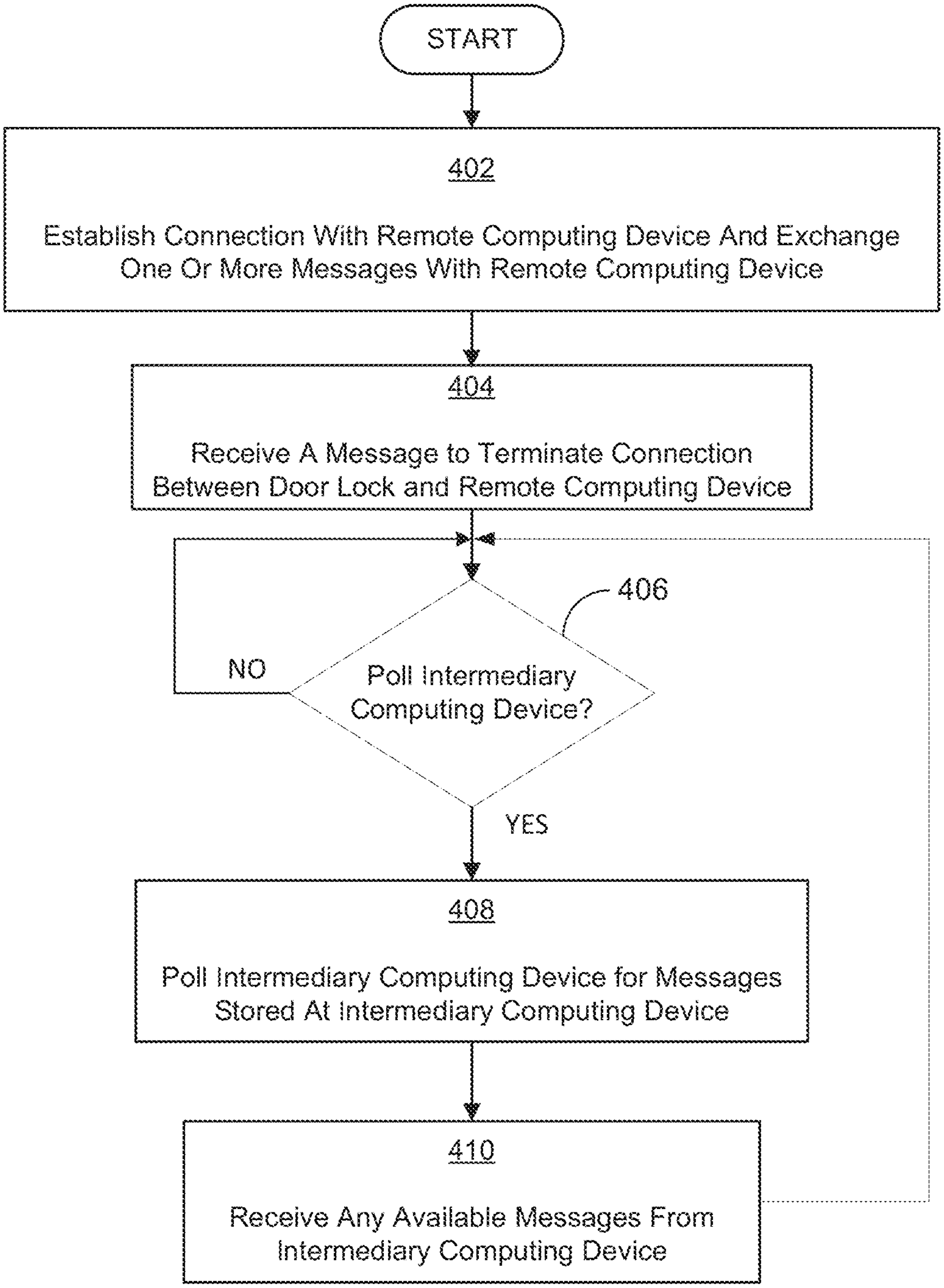
FIG. 4 is an example process performed by a door lock to enable timely reception of high-priority messages from an intermediary computing device, according to some embodiments of the technology described herein.

FIG. 4 is an example process performed by a door lock 104 to enable timely reception of high-priority messages from an intermediary computing device 102, according to some embodiments of the technology described herein. At act 402, the door lock 104 may establish a connection with the remote computing device 120 and exchange one or more messages with the remote computing device 120. In some embodiments, the door lock 104 may operate in a higher-power state when the connection is established. In some embodiments, the one or more messages exchanged with the remote computing device 120 may include lower priority messages, such as one or more software updates or upgrades for the door lock, or security changes or security policy updates for the door lock.

At act 404, the door lock 104 may receive a message to terminate the connection between the door lock 104 and the remote computing device 120. Following the termination, the door lock 104 may transition from the higher-power state to a lower-power state. In this lower-power state, the door lock 104 maintains an association with the intermediary computing device 102.

In some embodiments, when in the lower-power state, the door lock 104 may, occasionally or periodically at a pre-determined interval, re-enter a higher-power state to communicate with the intermediary computing device 102. For example, in act 406, the door lock 104 may determine whether to poll the intermediary computing device 102. In response to a determination to poll the intermediary computing device 102, for example, at the pre-determined interval, the door lock 104 may poll the intermediary computing device 102 for messages stored at the intermediary computing device 102, at act 408. The intermediary computing device 102 may have stored higher priority messages for the door lock 104, which may be communicated to the door lock 104 in response to the polling message from the door lock 104. At act 410, the door lock 104 may receive any available messages including the high priority messages from the intermediary computing device 102.

Figure 5:
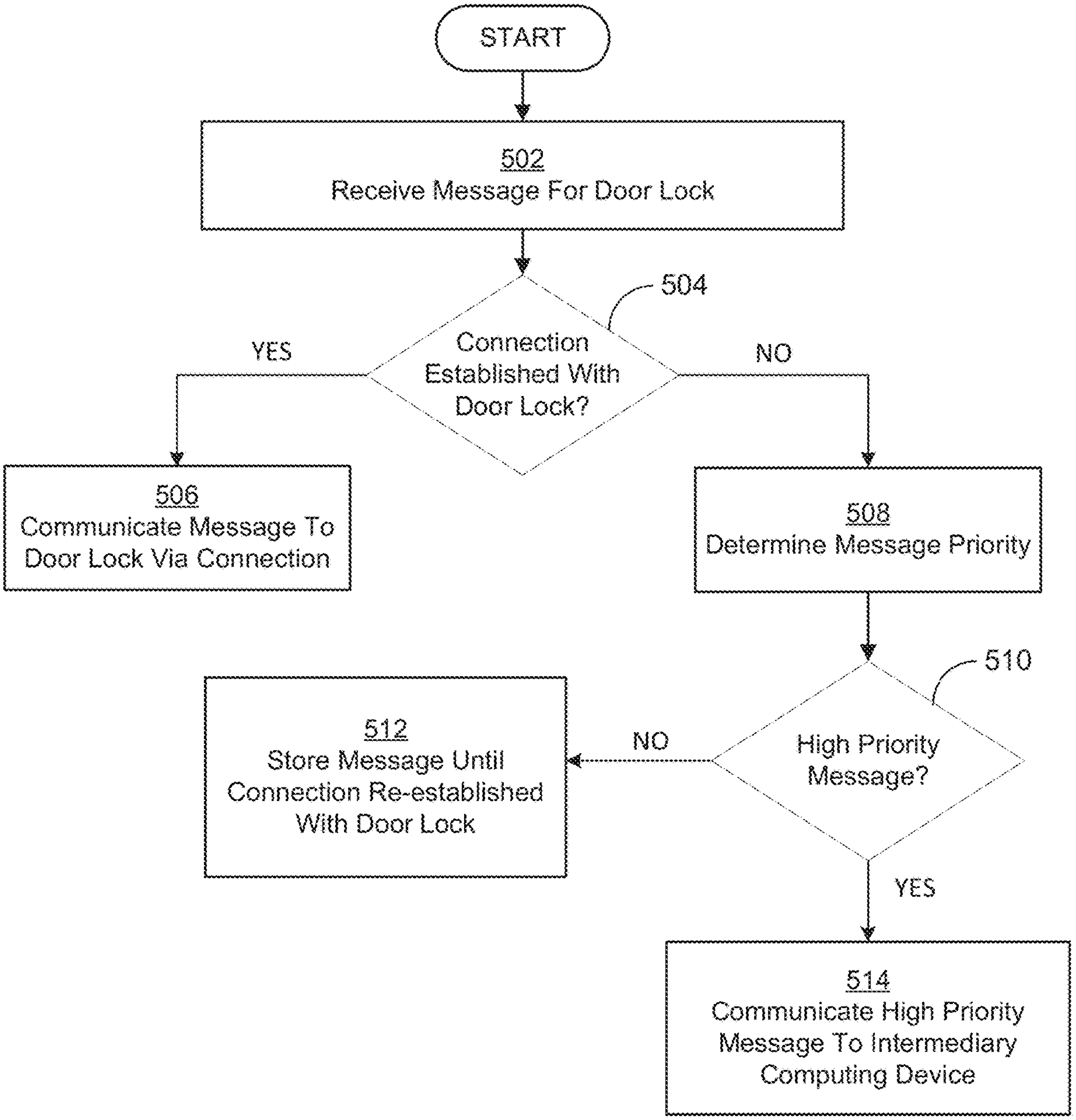
FIG. 5 is an example process performed by a remote computing device to enable communication of messages to a door lock and/or an intermediary computing device, according to some embodiments of the technology described herein.

FIG. 5 is an example process performed by a remote computing device 120 to enable communication of messages to a door lock 104 and/or an intermediary computing device 102, according to some embodiments of the technology described herein. At act 502, the remote computing device 120 may receive a message for a door lock 104. At act 504, the remote computing device 120 may determine whether a connection with the door lock 104 is established. In response to a determination that a connection with the door lock is established (e.g., when the door lock operates in a high-power state), the remote computing device 120 may communicate the message to the door lock 104 via the connection. In some embodiments, the message exchanged with the door lock 104 may include a lower priority message, such as a software update or upgrade for the door lock, or security changes or security policy updates for the door lock.

In some embodiments, in response to a determination that a connection with the door lock is not established, the remote computing device 120 may determine a priority associated with the message, at act 508. At act 510, the remote computing device 120 may determine whether the message to be communicated to the door lock is a high-priority message. In some embodiments, the message may be indicated as a high-priority message by a user of the mobile device 130, for example, in a scenario where the user detects a threat in the building. In some embodiments, the message may be indicated as a high-priority message by a monitoring system at the building, for example, in a scenario where the monitoring system detects a threat condition, such as a gunshot sound.

In some embodiments, in response to a determination that the message is a high-priority message, the remote computing device 120, at act 514, may communicate the high-priority message to the intermediary device 102 for transmission to the door lock 104.

In some embodiments, in response to a determination that the message is not a high-priority message (e.g., is a low-priority message), the remote computing device 120, at act 512, may store the message until a connection with the door lock 104 is re-established.

Example Computing Device

Figure 6:
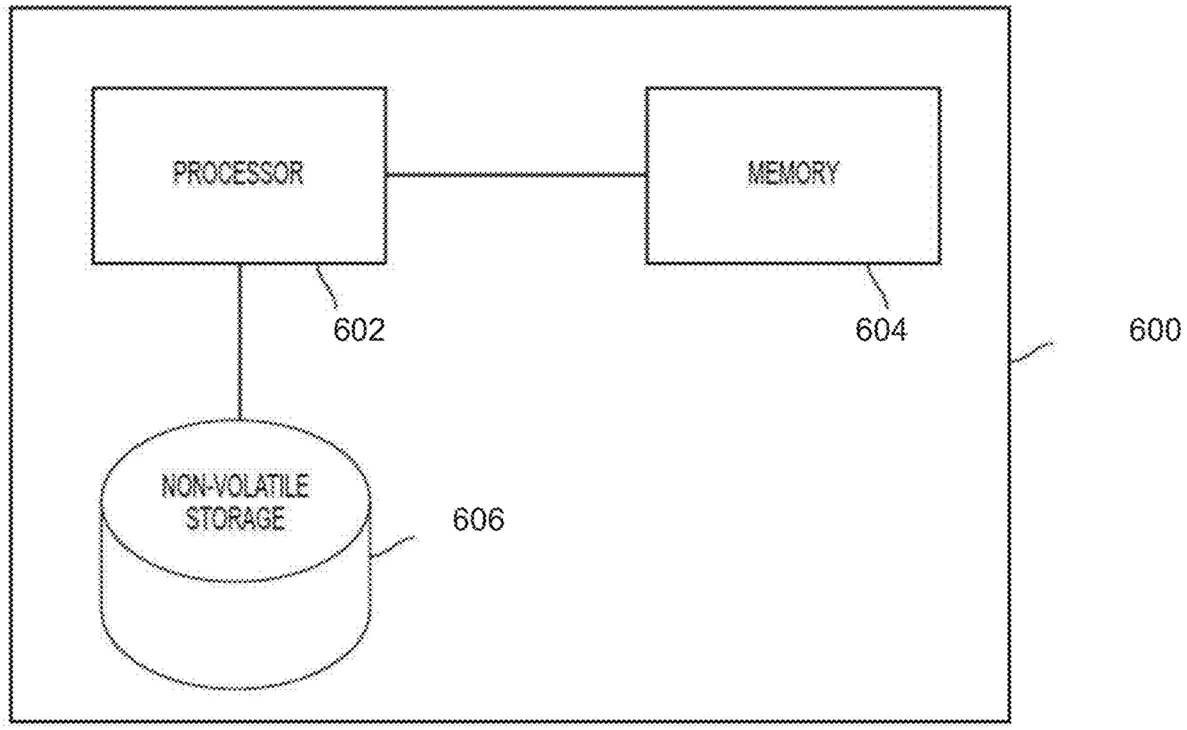
FIG. 6 is a block diagram of an example computer system, according to some embodiments of the technology described herein.

An illustrative implementation of a computing device 600 that may be used in connection with any of the embodiments of the disclosure provided herein is shown in FIG. 6. The computing device 600 may include one or more computer hardware processors 602 and one or more articles of manufacture that comprise non-transitory computer-readable storage media (e.g., memory 604 and one or more non-volatile storage devices 606). The processor 602(*s*) may control writing data to and reading data from the memory 604 and the non-volatile storage device(s) 606 in any suitable manner. To perform any of the functionality described herein, the processor(s) 602 may execute one or more processor-executable instructions stored in one or more non-transitory computer-readable storage media (e.g., the memory 604), which may serve as non-transitory computer-readable storage media storing processor-executable instructions for execution by the processor(s) 602.

The terms "program" or "software" are used herein in a generic sense to refer to any type of computer code or set of processor-executable instructions that can be employed to program a computer or other processor (physical or virtual) to implement various aspects of embodiments as discussed above. Additionally, according to one aspect, one or more computer programs that when executed perform methods of the disclosure provided herein need not reside on a single computer or processor, but may be distributed in a modular fashion among different computers or processors to implement various aspects of the disclosure provided herein.

Processor-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed.

Also, data structures may be stored in one or more non-transitory computer-readable storage media in any suitable form. For example, data structures may have fields that are related through location in the data structure. Such relationships may likewise be achieved by assigning storage for the fields with locations in a non-transitory computer-readable medium that convey relationship between the fields. However, any suitable mechanism may be used to establish relationships among information in fields of a data structure, including through the use of pointers, tags or other mechanisms that establish relationships among data elements.

Various inventive concepts may be embodied as one or more processes, of which examples have been provided. The acts performed as part of each process may be ordered in any suitable way. Thus, embodiments may be constructed in which acts are performed in an order different than illustrated, which may include performing some acts simultaneously, even though shown as sequential acts in illustrative embodiments.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, for example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term). The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments of the techniques described herein in detail, various modifications, and improvements will readily occur to those skilled in the art. Such modifications and improvements are intended to be within the spirit and scope of the disclosure. Accordingly, the foregoing description is by way of example only, and is not intended as limiting. The techniques are limited only as defined by the following claims and the equivalents thereto.

What is claimed is:

1. A method for enabling a door lock coupled to a door of a building to operate in a lower-power state while enabling communication between the door lock and a remote computing device, wherein the door lock consumes less power when operated in the lower-power state than when operated in a higher-power state, the method comprising:

receiving from the remote computing device, at a first computing device located at the building, a first message transmitted by the remote computing device to the door lock at the building, wherein:

the first computing device is distinct from the door lock and has previously associated with the door lock, the door lock has previously established and terminated a connection with the remote computing device prior to the receiving the first message, and the first message has a higher priority than a second message having a lower priority than the higher priority;

storing the first message having the higher priority at the first computing device until a first communication is received by the first computing device from the door lock; and in response to the first computing device receiving the first communication from the door lock, transmitting, by the first computing device, the first message having the higher priority received from the remote computing device to the door lock.

2. The method of claim 1, further comprising, prior to the first computing device receiving the first message transmitted by the remote computing device to the door lock at the building:

receiving, at the first computing device and from the door lock, a query to the remote computing device for messages to be delivered to the door lock;

relaying, by the first computing device, the query to the remote computing device;

receiving, by the first computing device, the second message having the lower priority; and relaying, by the first computing device, the second message to the door lock.

3. The method of claim 2, wherein the first message having the higher priority comprises a lockdown message instructing the door lock to trigger a lockdown.

4. The method of claim 2, wherein the first message having the higher priority comprises an access right revocation message instructing the door lock to trigger revocation of access rights for accessing the door lock.

5. The method of claim 1, further comprising, prior to the first computing device receiving the first message transmitted by the remote computing device to the door lock at the building:

relaying, between the door lock and the remote computing device, a third message establishing the connection between the remote computing device and the door lock;

relaying, between the door lock and the remote computing device, one or more fourth messages via the connection; and relaying, between the door lock and the remote computing device, at least one fifth message to terminate the connection between the remote computing device and the door lock while retaining an association between the first computing device and the door lock.

6. The method of claim 5, wherein receiving the first message transmitted by the remote computing device to the door lock at the building comprises receiving the first message following the relaying of the at least one fifth message and without relaying a further message re-establishing the connection between the remote computing device and the door lock.

7. A system, comprising:

a door lock coupled to a door of a building, wherein the door lock is configured to operate in a lower-power state while enabling communication between the door lock and a remote computing device, and wherein the door lock consumes less power when operated in the lower-power state than when operated in a higher-power state; and a first computing device located at the building, wherein the first computing device is configured to:

receive, from the remote computing device, a first message transmitted by the remote computing device to the door lock at the building, wherein:

the first computing device is distinct from the door lock and has previously associated with the door lock, the door lock has previously established and terminated a connection with the remote computing device prior to receiving the first message, and the first message has a higher priority than a second message having a lower priority than the higher priority;

store the first message having the higher priority until a first communication is received by the first computing device from the door lock, and in response to receiving the first communication from the door lock, transmit to the door lock the first message having the higher priority received from the remote computing device.

8. The system of claim 7, further comprising:

the remote computing device, wherein the remote computing device is configured to:

determine whether the first message having the higher priority is to be communicated to the door lock; and in response to determining that the first message having the higher priority is to be communicated to the door lock, transmitting the first message to the first computing device.

9. The system of claim 7, wherein the first message having the higher priority comprises a lockdown message instructing the door lock to trigger a lockdown.

10. The system of claim 7, wherein the first message having the higher priority comprises an access right revocation message instructing the door lock to trigger revocation of access rights for accessing the door lock.

11. The system of claim 7, wherein prior to the first computing device receiving the first message transmitted by the remote computing device to the door lock at the building, the first computing device is configured to:

relay, between the door lock and the remote computing device, a third message establishing the connection between the remote computing device and the door lock;

relay, between the door lock and the remote computing device, one or more fourth messages via the connection; and relay, between the door lock and the remote computing device, at least one fifth message to terminate the connection between the remote computing device and the door lock while retaining an association between the first computing device and the door lock.

12. The system of claim 11, wherein receiving the first message transmitted by the remote computing device to the door lock at the building comprises receiving the first message following the relaying of the at least one fifth message and without relaying a further message re-establishing the connection between the remote computing device and the door lock.

13. The system of claim 7, wherein the door lock transitions from the lower-power state to the higher-power state to transmit the first communication to the first computing device and transitions back to the lower-power state after the first message is received from the first computing device.

14. A method for enabling a door lock coupled to a door of a building to operate in a lower-power state while enabling communication between the door lock and a remote computing device, wherein the door lock consumes less power when operated in the lower-power state than when operated in a higher-power state, the method comprising:

receiving, at the door lock and from the remote computing device, at least one first message via a communication session between the door lock and the remote computing device, the at least one first message having a lower priority than at least one second message having a higher priority than the lower priority;

in response to receiving at least one third message to terminate the communication session between the door lock and the remote computing device, terminating the communication session;

retaining an association between the door lock and a first computing device located at the building, wherein the first computing device is distinct from the door lock;

following the receiving of the at least one third message and without receiving a further message to re-establish the communication session between the door lock and the remote computing device:

transmitting, by the door lock, a first communication to the first computing device, the first communication comprising a request for the at least one second message having the higher priority stored at the first computing device, wherein the at least one second message having the higher priority was transmitted to the first computing device by the remote computing device; and receiving, by the door lock, the at least one second message having the higher priority from the first computing device in response to the first communication.

15. The method of claim 14, wherein the at least one first message having the lower priority comprises a firmware update for the door lock.

16. The method of claim 14, wherein the at least one second message having the higher priority comprises a lockdown message instructing the door lock to trigger a lockdown.

17. The method of claim 14, wherein the at least one second message having the higher priority comprises an access right revocation message instructing the door lock to trigger revocation of access rights for accessing the door lock.

18. The method of claim 14, wherein the first communication comprises a polling message including the request for the at least one second message.

19. The method of claim 14, wherein the door lock operates in the higher-power state when the at least one first message is received.

20. The method of claim 19, wherein the door lock transitions from the higher-power state to the lower-power state after the receiving the at least one third message to terminate the communication session.

* * * * *